(12) United States Patent
Duncan et al.

(10) Patent No.: US 11,072,497 B2
(45) Date of Patent: Jul. 27, 2021

(54) AUTOMATIC DRIVE BELT BIASING DEVICE

(71) Applicant: Dematic Corp., Grand Rapids, MI (US)

(72) Inventors: Jeffery D. Duncan, Gowen, MI (US); Nicholas M. Thomas, Cedar Springs, MI (US); Nolan R. Pilarz, Ada, MI (US); Thomas H. Triesenberg, Rockford, MI (US); Shreedhar M. Hebbur, Byron Center, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 16/870,236

(22) Filed: May 8, 2020

(65) Prior Publication Data

US 2020/0354153 A1 Nov. 12, 2020

Related U.S. Application Data

(60) Provisional application No. 62/846,205, filed on May 10, 2019.

(51) Int. Cl.
*B65G 23/44* (2006.01)
*B65G 43/00* (2006.01)
*B65G 13/07* (2006.01)

(52) U.S. Cl.
CPC ............ *B65G 23/44* (2013.01); *B65G 13/07* (2013.01); *B65G 43/00* (2013.01)

(58) Field of Classification Search
CPC ...... B65G 13/07; B65G 13/071; B65G 23/44; B65G 43/00

USPC ............. 198/781.07, 781.08, 781.09, 781.1, 198/781.11, 790, 833, 814
See application file for complete search history.

(56) References Cited

U.S. PATENT DOCUMENTS

| | | | | | |
|---|---|---|---|---|---|
| 2,493,479 | A | * | 1/1950 | Eggleston | B65G 47/261 198/790 |
| 3,549,002 | A | * | 12/1970 | Leach | B65G 47/261 198/781.08 |
| 3,939,962 | A | * | 2/1976 | Gebhardt | B65G 47/261 198/781.08 |
| 4,252,234 | A | * | 2/1981 | Brouwer | B65G 13/07 198/790 |
| 4,308,946 | A | * | 1/1982 | Ouellette | B65G 13/07 198/790 |
| 4,570,780 | A | * | 2/1986 | Thwaites | B65G 47/261 198/781.06 |

(Continued)

*Primary Examiner* — James R Bidwell
(74) *Attorney, Agent, or Firm* — Gardner, Linn, Burkhart & Ondersma LLP; Bryce A. Whitworth

(57) ABSTRACT

An automatic belt biasing device is provided for biasing a drive belt into frictional contact with rollers of a conveyor. The belt biasing device maintains a drive belt in contact with rollers of a live roller conveyor to provide drive for the rollers to propel items or packages along the conveyor. A spring attached to a pivot arm or pair of scissoring pivot arms adjusts a biasing force applied by guide wheels of the belt biasing device to the drive belt due to changes in drive belt tension. The belt biasing device may be selectively adjustable based on required roller pitch distances. The belt biasing device is pivotably coupled to the roller conveyor allowing the guide wheels to apply equal pressure to the drive belt while allowing the pivot arms to actuate and increase or decrease the biasing force provided by the belt biasing device.

20 Claims, 6 Drawing Sheets

(56) References Cited

U.S. PATENT DOCUMENTS

| | | | | |
|---|---|---|---|---|
| 4,895,247 A | * | 1/1990 | Marchetti | B65G 13/071 |
| | | | | 198/790 |
| 6,065,588 A | * | 5/2000 | Cotter | B65G 47/261 |
| | | | | 198/781.06 |
| 6,478,142 B2 | | 11/2002 | Cotter et al. | |
| 7,841,461 B2 | | 11/2010 | Nguyen et al. | |

* cited by examiner

AUTOMATIC DRIVE BELT BIASING DEVICE

CROSS REFERENCE TO RELATED APPLICATION

The present application claims priority of U.S. provisional application Ser. No. 62/846,205 filed May 10, 2019, which is hereby incorporated herein by reference in its entirety.

FIELD OF THE INVENTION

The present invention is directed generally to powered conveyors and, more particularly, to powered roller conveyors.

BACKGROUND OF THE INVENTION

Roller transport conveyors are known to include a plurality of rollers for conveying objects such as packages thereon. The rollers may be powered by a drive device such as an endless drive belt that is driven by an electric motor or the like. Manually adjustable belt tensioners or biasing devices are often provided with a roller transport conveyor to adjust the position of a belt to bias the belt into frictional contact with the rollers to drive the rollers and the conveyor. Improper drive belt tension, either too much or too little tension, due to improper belt positioning increases wear on the belt, decreases driving force of the belt, creates inconsistent drive to the rollers, and decreases the working life of the belt.

SUMMARY OF THE INVENTION

The present invention provides a live roller conveyor including an automatic drive element or drive member biasing device for adjusting the position and tension of a drive element to maintain adequate frictional contact between the drive element and rollers of a roller conveyor system. The automatic biasing device adjusts the position of the drive element by applying a biasing force to the drive element. The automatic biasing device includes a spring for automatically adjusting the biasing force as required due to factors including stretching of the drive element, rattling and shaking of the conveyor system, bouncing of the drive element, power surges from a drive motor experienced by the drive element, and other factors that will be appreciated. The automatic biasing device decreases wear and fatigue in the drive element due to inadequate tension and decreases maintenance requirements of the conveyor system, such as manually adjusting or tightening drive element tensioning or biasing devices.

According to one form of the invention, a transport conveyor conveys items in a direction of conveyance. An endless drive element or member, such as a v-belt, a poly-v belt, a round belt, or a double v-belt, is automatically biased into frictional engagement with the rollers to drive the rollers. An automatic drive belt biasing device, including at least one drive belt guide wheel, at least one pivot arm or pivot member, and a spring, is operable to bias the drive belt toward the rollers. The automatic biasing device is pivotably supported at the conveyor about a pivot point disposed proximate a center portion of the pivot arm. A drive belt guide wheel is rotatably coupled to one end of the pivot arm and is positioned proximate the drive belt. The spring is coupled at one end to the pivot arm such that the spring counteracts movement of the pivot arm. Preferably the spring is a tension spring coupled to the end of the pivot arm opposite the guide wheel, however, other types of springs, such as compression springs or torsion springs, may be utilized in the alternative. Optionally, the spring is fixed at its other end to a portion of a frame of the conveyor such that the spring is substantially parallel to the drive belt. The spring is operable to actuate the pivot arm, wherein the actuation raises and lowers the drive belt guide wheel toward or away from the path of the drive belt. As the drive belt interacts with the drive belt guide wheel the guide wheel may be displaced. The displacement of the guide wheel causes the arm to actuate and the actuation of the arm elongates or shortens the spring. When the drive belt pushes towards the guide wheel, the spring is elongated and the biasing force increases. When the drive belt moves away from the guide wheels, the spring is shortened and the biasing force decreases. Optionally, the spring tension of the spring may be selected such that when the drive belt and the automatic biasing device are in equilibrium the spring is at least partially stretched, such that if the drive belt stretches, acquires slack, and/or rattles, bounces, or moves relative to the conveyor rollers, the automatic biasing device continues to provide biasing force to the drive belt to position the drive belt in contact with the rollers to ensure adequate contact and friction between the drive belt and the conveyor roller.

In one aspect, the pivot arm of the automatic biasing device includes a long leg or member and a short leg or member fixed together at respective proximal ends to form the pivot arm. Preferably, the long leg and short leg are fixed at an obtuse angle with respect to each other. A pivot hole is disposed proximate to the intersection of the proximal ends of the long and short leg. Each of the long and short leg includes a guide wheel mount hole and a spring mount hole disposed in the pivot arm near their respective distal ends. Optionally, the long leg includes an indicator, such as a shape disposed on or in the long leg, such as a circle or triangle hole, and the short leg includes a different indicator, such as a different shape disposed on or in the short leg, such as a square hole. The indicators allow a user to easily identify which leg is the long leg and which leg is the short leg.

In another aspect, the automatic biasing device is disassembleable to reconfigure the desired positions of the spring and guide wheel by switching the positions of the guide wheel and the spring from their respective positions on the long leg and short leg, such that at least two wheel position configurations are possible. For example, in one configuration, the guide wheel is rotatably coupled at the guide wheel hole of the long leg of the pivot arm and the spring is coupled at the spring hole of the short leg of the pivot arm.

In another form of the present invention, the automatic drive belt biasing device includes two drive belt guide wheels, a pair of pivot arms, and a spring. The pair of pivot arms are pivotably coupled to each other in a manner to form an opposing or scissoring arm assembly. The automatic biasing device is pivotably supported at the conveyor about a pivot point disposed proximate a center portion of the scissoring arm assembly. One of the drive belt guide wheels is rotatably coupled to one end of each of the pivot arms and positioned proximate the drive belt. The spring is coupled at each of the spring's ends between the pivot arms such that the spring counteracts movement of the pivot arms. Preferably the spring is a tension spring coupled to the ends of the pivot arms opposite the guide wheels, however, other types of springs, such as compression springs or torsion springs, may also be utilized. The spring is configured to actuate the scissoring pivot arms, wherein the actuation raises and/or lowers the drive belt guide wheels. As the drive belt interacts with the drive belt guide wheels the guide wheels may be displaced. The displacement of the guide wheels cause the arms to scissor or actuate and the scissoring of the arms elongates or shortens the spring, thereby automatically adjusting the force that the spring exerts on the scissoring arms.

In one aspect, the opposing or scissoring pivot arms of the automatic biasing device include a long leg and a short leg fixed together at respective proximal ends to form each of the pivot arms. Preferably, the long leg and short leg are fixed at an obtuse angle with respect to each other. A pivot hole is disposed proximate to the intersection of the proximal ends of the long and short legs. A pair of the pivot arms are pivotably coupled together at the pivot holes of the pivot arms. Each of the long and short legs include a guide wheel mount hole and a spring mount hole disposed in the pivot arm near their respective distal ends. Optionally, the long legs include an indicator, such as a shape disposed on or in the long leg, such as a circle or triangle hole, and the short legs include a different indicator, such as a different shape disposed on or in the short leg, such as a square hole, such that a user may easily identify which legs are longer or shorter.

A wheel pitch distance is defined by the distance between each center of the guide wheel mount holes that accommodate the guide wheels. Preferably, the wheel pitch distance is set to distance that is substantially equal to the distance between the axial center of a first roller and the axial center of a third roller of a set of three consecutive rollers. Preferably, the guide wheels are positioned substantially at the center of gaps between rollers.

In another aspect, the pivot arm assembly may be reconfigurable to change the wheel pitch distance by switching the positions of the guide wheels and the springs from their respective positions on the long legs and short legs, such that at least two wheel pitch configurations are possible. For example, in one configuration, the guide wheels are rotatably coupled at the guide wheel holes of the long legs of the pivot arms and the spring is coupled at each end to the spring holes of the short legs of the pivot arms. When the guide wheels are disposed on the long legs, the guide wheel pitch distance is at a "wide" setting. In second configuration, the guide wheels are rotatably coupled at the guide wheel holes of the short legs of the pivot arms and the spring is coupled at each end to the spring holes of the long legs of the pivot arms. When the guide wheels are disposed on the short legs, the guide wheel pitch distance is at a "narrow" setting.

According to another form of the present invention, a method is provided for automatically biasing a drive belt into frictional contact with a conveyor roller or plurality of conveyor rollers. The method includes automatically and continuously adjusting the biasing force of a spring of an automatic belt biasing device due to changes in force between the drive belt and the automatic belt biasing device. The adjusted biasing force is applied to belt guide wheels of the automatic belt biasing device and that biasing force is transferred or applied as a biasing force to the drive belt by the belt guide wheels. The drive belt is biased by the biasing force from the wheels into frictional contact with the roller to frictionally drive the roller conveyor.

Therefore, the present invention provides a device and method for automatically biasing an endless drive element of a roller conveyor. The automatic belt biasing device includes a spring to automatically adjust the biasing force applied to the drive belt to maintain frictional contact between the drive belt and a roller or rollers of the conveyor. The automatic belt biasing device reduces wear of the drive belt by absorbing shock, vibration, and bouncing of the drive belt and may take up some slack caused by lengthening of the drive belt over time due to fatigue in the belt. The automatic belt biasing device may include adjustable guide wheel pitch distances or spacings such that the device can be disassembled or reconfigured from one wheel pitch configuration into a different wheel pitch configuration.

These and other objects, advantages, purposes, and features of the present invention will become more apparent upon review of the following specification in conjunction with the drawings.

DESCRIPTION OF THE PREFERRED EMBODIMENTS

Figure 1:
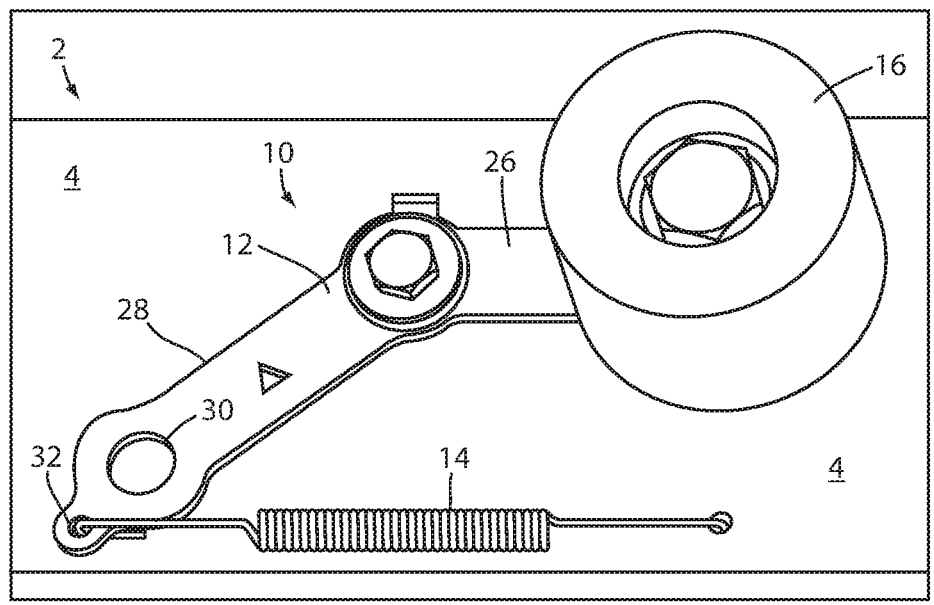
FIG. 1 is a perspective view of an automatic drive belt biasing device in accordance with an embodiment of the present invention.

Referring now to the drawings and the illustrative embodiments depicted therein, a roller conveyer 2 includes a conveyor frame 4, a plurality of freely rotatable rollers 6 disposed along the conveyor frame 4, an endless drive element or member 8, and an automatic drive member biasing device 10. The endless drive member 8 may be a drive belt such as any of a v-belt, a poly v-belt, a flat belt, a flanged belt, a round belt, and a double v-belt. The automatic drive belt biasing device 10 includes a at least one pivoting arm, leg frame, or body 12, a spring 14, and at least one drive belt guide wheel 16 in combination, configured to bias the endless drive member 8 into frictional contact with at least one of the conveyor rollers 6 (FIG. 1). The spring 14 is coupled to a portion of the pivot arm 12 to bias the guide wheel 16 toward the drive member 8. The spring 14 is preferably a tension spring, however, it will be appreciated that the automatic biasing device 10 may utilize other types of springs in the alternative. The automatic biasing device 10 provides a generally constant and automatic biasing force or pressure to the drive member 8 to properly position the drive member 8, which removes the need for repetitive tightening or adjustment of a tension providing member or biasing device, such as hammering a tension member into place and tightening it.

In one embodiment, the pivot arm 12 includes a pivot or mount hole 22 disposed at a central portion of the arm 12. The belt biasing device 10 is pivotably coupled to a portion of the conveyor frame 4 at the pivot hole 22 of the arm 12. The arm 12 includes a short member or leg 26 extending from the pivot hole 22 and a long member or leg 28 extending from the pivot hole 22, wherein the short leg 26 and the long leg 28 form an obtuse angle relative to each other originating at the pivot hole 22. A wheel mount hole 30 is disposed in a distal end of the short leg 26 and a distal end of the long leg 28. Each wheel mount hole 30 is configured to accept and secure a rotatable drive belt guide wheel 16 to the arm 12. The drive belt guide wheel 16 is freely rotatable about an axis that is substantially perpendicular to the center of the wheel mount hole 30. A spring mount hole 32 is disposed at a distal end of the short leg 26 and at a distal end of the long leg 28. The spring mount holes 32 are disposed proximate to the wheel mount holes 30 of each leg 26, 28 and are configured to accept and removably secure an end of the spring 14.

In the illustrated embodiment of FIG. 1, the pivot arm 12 is reconfigurable in to at least two configurations wherein the leg coupled with the guide wheel 16 is the "wheel side" leg and the leg coupled with the spring 14 is the "spring side" leg. For example, in one configuration the guide wheel 16 is mounted in the wheel mount hole 30 of the short leg 26 and the spring 14, formed as a tension spring, is coupled to the spring mount hole 32 of the long leg 28. In another configuration, the guide wheel 16 is mounted in the wheel mount hole 30 of the long leg 28 and the spring 14 is coupled to the spring mount hole 32 of the short leg 26. A user may remove the belt biasing device 10 from the conveyor frame 4, remove and reposition the spring 14 and guide wheel 16 to the opposite legs 26, 28, to switch from one configuration to another, and replace it on the conveyor frame 4. The user may determine the required configuration based on factors including the diameter of the rollers 6 and the pitch distance of the roller spacing.

In one embodiment, the belt biasing device 10 is pivotable about an axis that is substantially perpendicular to the center of the pivot hole 22 and perpendicular to the drive belt 8, such that the belt biasing device 10 pivots to maintain the guide wheel generally in contact with the drive belt 8 during vibration of the conveyor. The belt biasing device 10 is self-adjusting due to the coordination of the spring 14, the pivot arm 16, and the pivot axis at pivot holes 22 such that the wheel 16 is biased toward the drive belt 8 to remain substantially in contact with the drive belt 8. Preferably, the belt biasing device 10 is positioned relative to the rollers 6 such that the center of the guide wheel 16 is substantially aligned between two consecutive rollers 6, such that the center of the guide wheel would be disposed substantially on a line perpendicular to the plane defined by the rollers 6 of the conveyer, substantially between two of the rollers 6.

Referring to FIGS. 2-4, and 6, an automatic drive belt biasing device 10a includes a pair of pivot arms or bodies 12, a tension spring 14, and a pair of drive belt guide wheels 16 in combination, configured to bias the drive belt into frictional contact with the conveyor rollers 6. The pair of pivot arms 12 are pivotably coupled together at pivot holes 22 of each pivot arm 12 to form a scissor arm assembly 18, such that the pivot arms 12 scissor or oppose each other. One of the pair of guide wheels 16 is disposed at one end of each of the pivot arms 12. The spring 14 is disposed with a portion of each pivot arm 12 opposite the guide wheel 16 to bias the guide wheel 16 toward the drive belt 8. The belt biasing device 10a provides a generally constant and automatic biasing force or pressure to the drive belt 8 to properly position the drive belt 8, which removes the need for repetitive tightening or adjustment of a tension providing member, system, or biasing device, such as hammering a tension member into place and tightening it. The belt biasing device 10a is self-adjusting due to the pivot axis at pivot holes 22 such that both wheels 16 are biased toward the drive belt 18 with substantially equal pressure.

Figure 3:
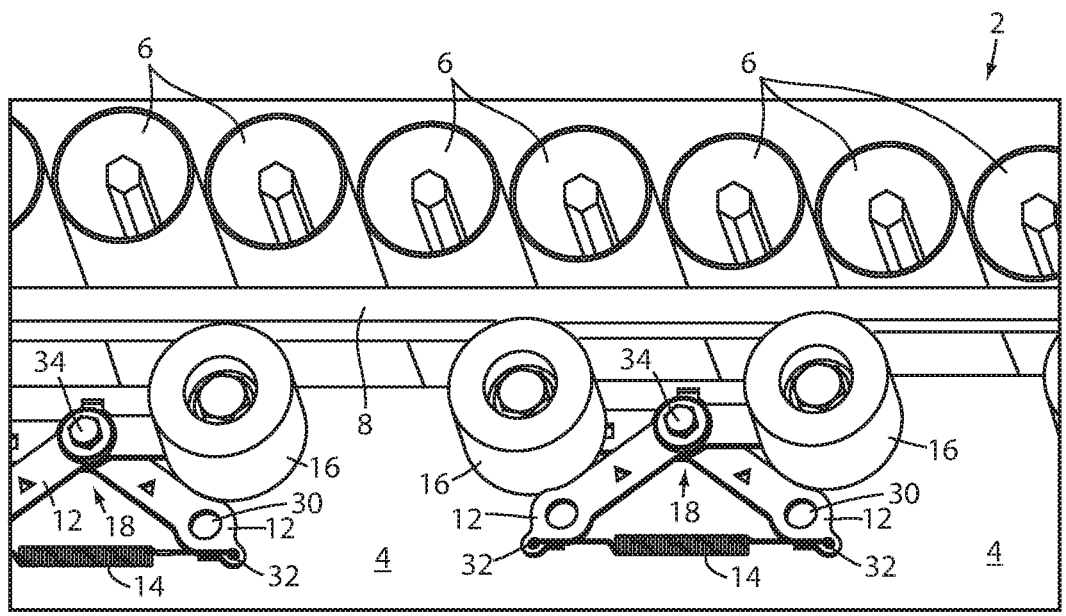
FIG. 3 is a perspective view of the automatic drive belt biasing device of FIG. 2, disposed with a roller conveyor system.
Figure 5:
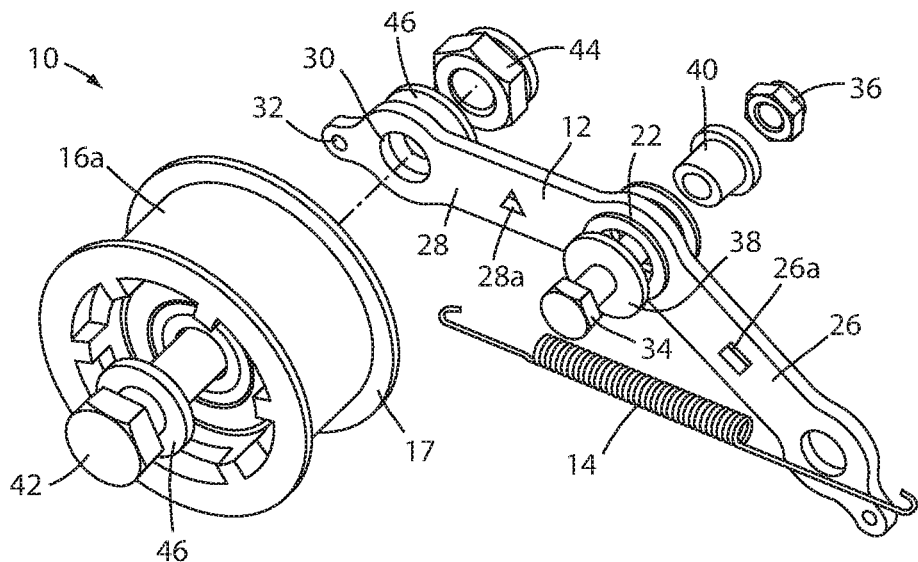
FIG. 5 is an exploded perspective view of the automatic drive belt biasing device of FIG. 1.
Figure 6:
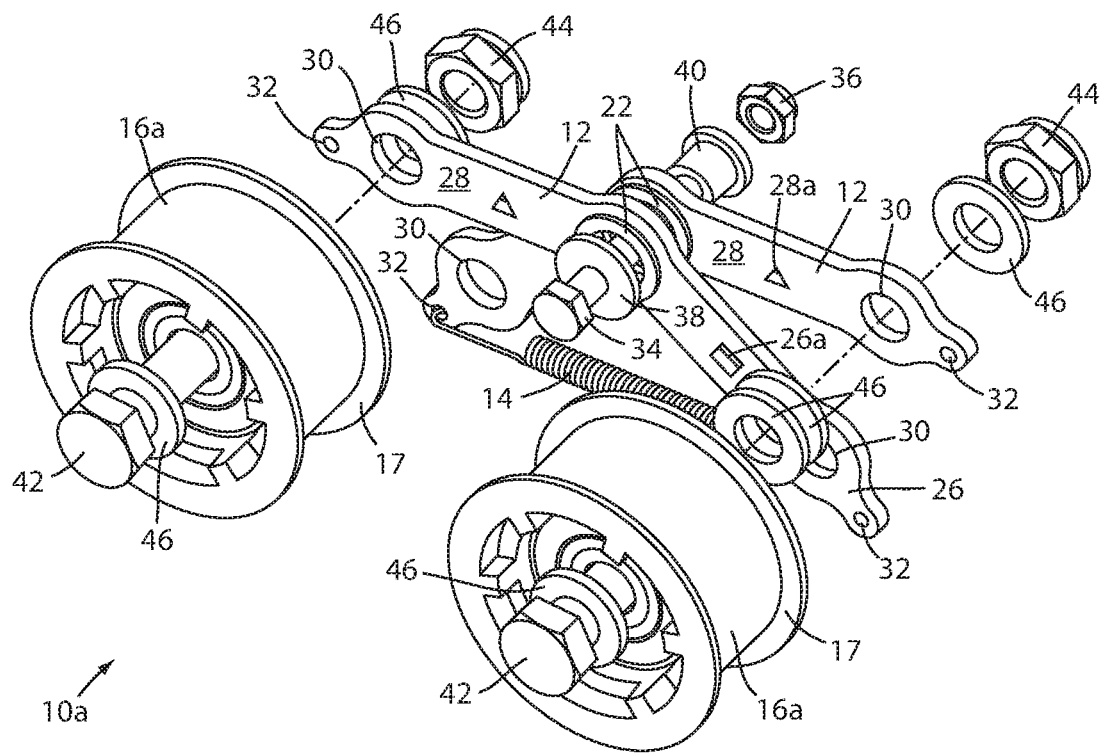
FIG. 6 is an exploded perspective view of the automatic drive belt biasing device of FIG. 2.
Figure 7:
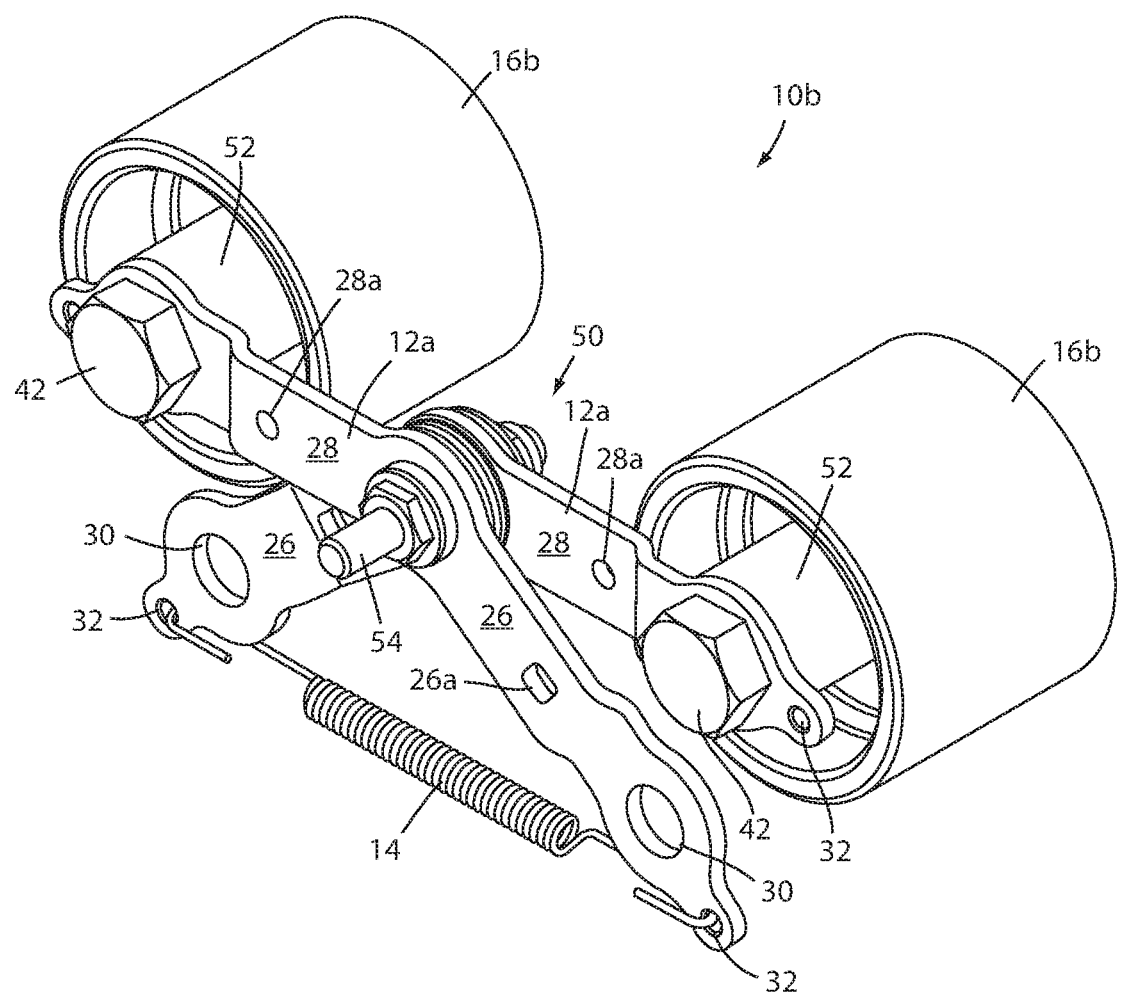
FIG. 7 is a perspective view of another automatic drive belt biasing device in accordance with an embodiment of the present invention, including a scissoring arm assembly.
Figure 8:
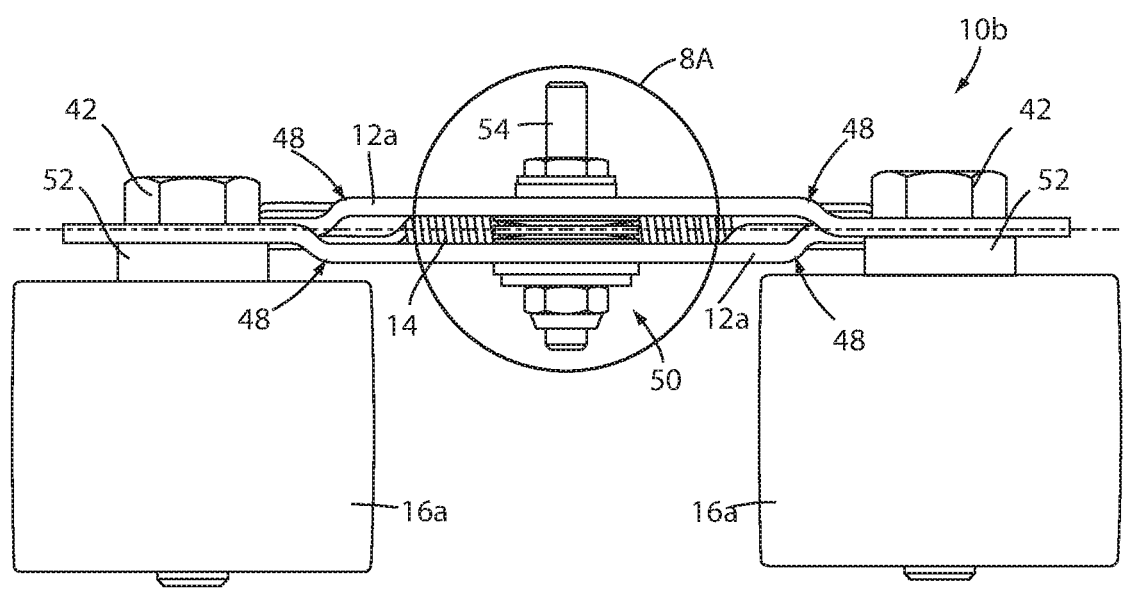
FIG. 8 is top-down plan view of the automatic drive belt biasing device of FIG. 7.
Figure 9:
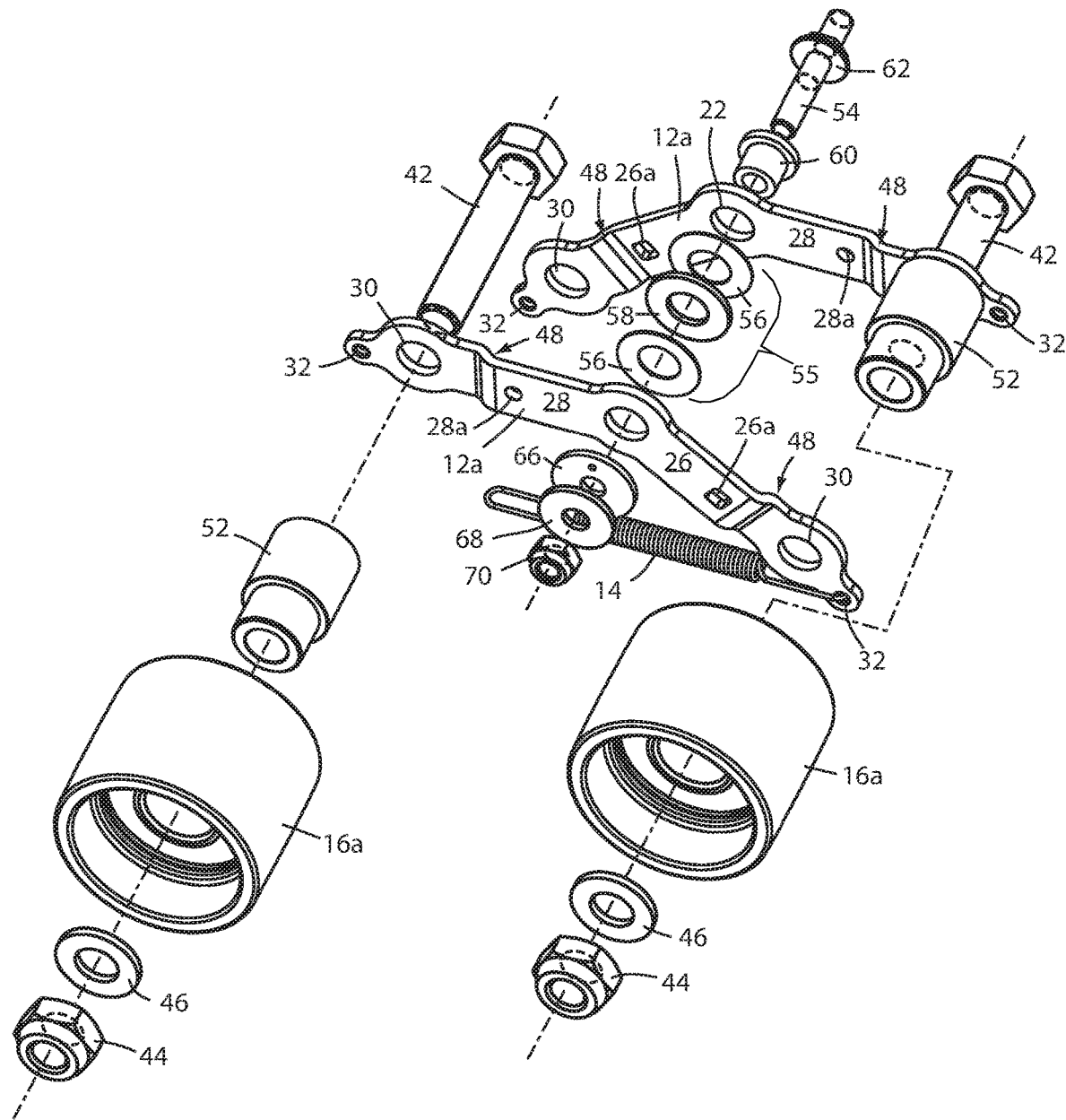
FIG. 9 is an exploded perspective view of the automatic drive belt biasing device of FIG. 7.

The belt biasing device 10a is pivotably coupled to a portion of the conveyor frame 4, at the pivot hole 22 of each pivot arm 12 (FIG. 3). The belt biasing device 10a is pivotable about an axis that is substantially perpendicular to the center of the pivot hole 22 and perpendicular to the drive belt 8, such that the belt biasing device 10 pivots to maintain the guide wheels 16 generally in contact with the drive belt 8 during vibration of the conveyor. Optionally, and as illustrated in FIGS. 5 and 6, guide wheels 16a include a flange 17 disposed at the outer edges of the wheels 16a to retain the drive belt 8 above or within an envelope proximate the guide wheels 16a. The drive path of the belt 8 may be defined by the guide wheels 16a such that the flanges 17 retain the drive belt 8 within the drive path to ensure proper alignment of the belt relative to the rollers 6. Alternatively, as illustrated in FIGS. 7-9, the guide wheels 16b may define a crowned surface at which the drive belt 8 contacts the wheel 16b. The crowned surface defines a convex profile having a slightly larger diameter at the middle of the wheel surface than at the edges of the wheel surface. Optionally, the guide wheels of devices 10, 10a, or 10b may be over-molded or coated with a plastic material.

Figure 2:
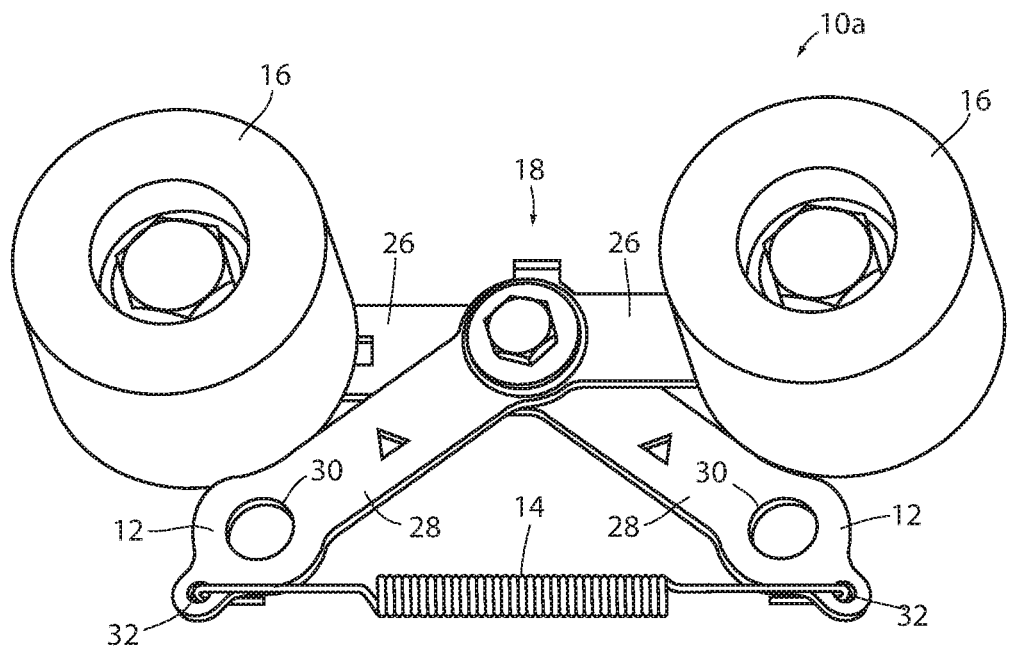
FIG. 2 is a perspective view of another automatic drive belt biasing device in accordance with an embodiment of the present invention, including a scissoring arm assembly.

As illustrated in FIGS. 2 and 6, each arm 12 of the belt biasing device 10a includes a short leg 26 extending from the pivot hole 22 and a long leg 28 extending from the pivot hole 22, wherein the short leg 26 and the long leg 28 form an obtuse angle relative to each other originating at the pivot hole 22. A wheel mount hole 30 is disposed in a distal end of the short leg 26 and a distal end of the long leg 28 of each pivot arm 12. Each wheel mount hole 30 is configured to accept and secure a drive belt guide wheel 16 to the arm 12. The drive belt guide wheel 16 is freely rotatable about an axis that is substantially perpendicular to the center of the wheel mount hole 30. A spring mount hole 32 is disposed at a distal end of the short leg 26 and at a distal end of the long leg 28. The spring mount holes 32 are disposed proximate to the wheel mount holes 30 of each leg 26, 28 and are configured to accept and removably secure an end of the spring 14.

The scissor arm assembly 18 of the belt biasing device 10a is positionable in at least two configurations, in one configuration the guide wheels 16 are mounted in the wheel mount holes 30 of the short legs 26 and the spring 14 is coupled to the spring mount holes 32 of the long legs 28, in another configuration, the guide wheels 16 are mounted in the wheel mount holes 30 of the long legs 28 and the spring 14 is coupled to the spring mount holes 32 of the short legs 26. A user may remove the belt biasing device 10a from the conveyor frame 4, disassemble the scissor arm assembly 18 by removing and repositioning the spring 14 and guide wheels 16 to the opposite legs 26, 28, reassembling the scissor arm assembly 18 in the other configuration, and replacing it on the conveyor frame 4. The user may determine the required configuration based on factors including the diameter of the rollers 6 and the pitch of the roller spacing.

Figure 4:
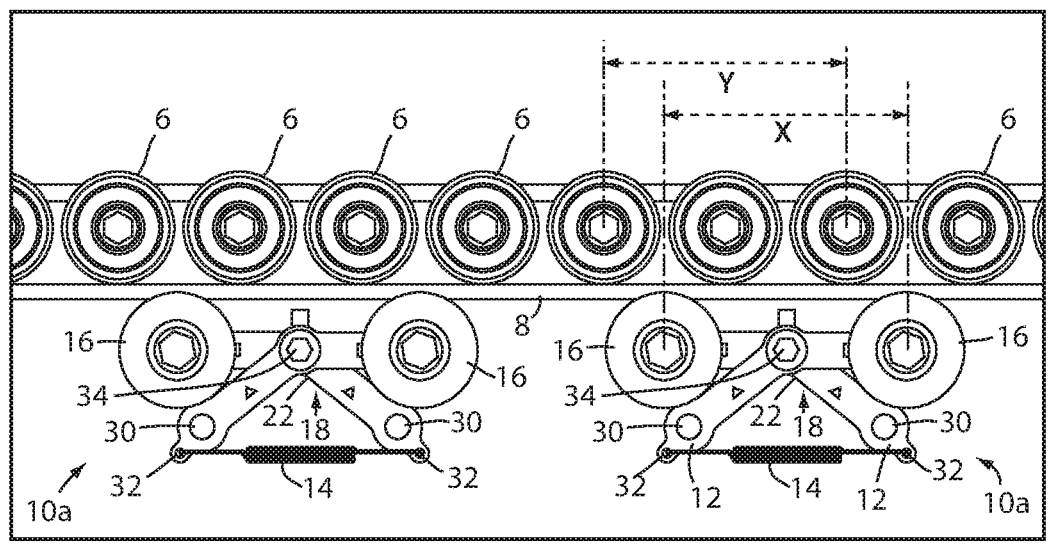
FIG. 4 is a front view of the automatic drive belt biasing device of FIG. 3.

As illustrated in FIG. 4, the pitch distance X of the wheels 16 of the belt biasing device 10a, defining the distance between the center points of the wheel mount holes 30 of each of the pivot arm 12, is configured to be substantially equal to a distance Y between the center axes of a first and a third roller of three consecutive rollers 6 of the conveyor 2. The belt biasing device 10a is positioned relative to the rollers 6 such that the center of each wheel mount hole 30 is substantially aligned between two consecutive rollers 6, such that the center of hole 30 would be disposed substantially on a line perpendicular to the plane defined by the rollers 6 of the conveyer, substantially between two rollers 6.

The pitch distance X of the wheels is configurable for a plurality of diameters of rollers and a plurality of spacing or pitch distances Y of the rollers (see FIG. 4). Because each pivot arm 12 of the belt biasing device 10a is identical and interchangeable and the arms 12 are configured to oppose each other, the pitch distance X of the wheels is adjustable between at least two possible distance configurations depending whether the guide wheels 16 are disposed on the short legs 26 or the long legs 28 of the arms 12. In one embodiment, the belt biasing device 10a is configured for a wider wheel pitch $X_{wide}$ with one guide wheel 16 disposed at the wheel mount hole 30 of the long leg 28 of each arm 12. The spring 14 is removably coupled at one of its ends to a spring hole 32 of the short leg 26 of one of the arms 12 and removably coupled at its other end to a spring hole 32 of the short leg 26 of the other arm 12. In this configuration, the long legs 28 represent "wheel side" legs of the belt biasing device 10a and the short legs 26 represent "spring side" legs of the belt biasing device 10a. In another embodiment, the belt biasing device 10a is configured for a narrower wheel pitch $X_{narrow}$ with one guide wheel 16 disposed at the wheel mount hole 30 of the short leg 26 of each arm 12. The spring 14 is removably coupled at one of its ends to a spring hole 32 of the long leg 28 of one of the arms 12 and removably coupled at its other end to a spring hole 32 of the long leg 28 of the pivot arm 12. In this configuration, the short legs 26 represent "wheel side" legs of the belt biasing device 10a and the long legs 28 represent "spring side" legs of the belt biasing device 10a. The short legs 26 and the long legs 28 of each pivot arm 12 may include a distinct or unique indicia or indicator symbol formed in or applied to the respective leg to indicate which leg is the short leg 26 or long leg 28, such that a user can configure the legs 26 and 28 as necessary for setting the pitch distance X of the device 10a. For example, in the illustrated embodiment of FIGS. 5 and 6 the long leg 28 of the pivot arm 12 includes a triangle hole 28a defining the long leg indicator and the short leg includes a square hole 26a defining the short leg indicator, such that a user may easily identify which leg is the long leg 28 and which leg is the short leg 26 without the need to measure the legs. While the indicia are illustrated as triangle holes 28a and square holes 26a, any shape of indicia may be chosen as desired or as required based on manufacturability, such as circle holes or stamped shapes.

The belt biasing device 10 provides an automatic biasing force to bias the guide wheel 16 into frictional contact with the drive belt 8 that is durable, self-adjusting, and capable of withstanding vibration and bouncing experienced during operation of the conveyor system. The spring 14 provides tension the spring side leg of the arm 12, the tension on the spring side leg causes lever action about the pivot holes 22 and thus transfers a biasing force to the wheel side leg of the arm 12. The spring 14 is chosen with a desired spring constant or spring force to provide a desired amount of biasing force to the guide wheel 16 depending on varying factors of the conveyor system, including the stiffness of the drive belt 8, the size of the drive belt 8, the frictional coefficients between the drive belt 8 and the rollers 6, the diameter of the rollers 6, the power of the drive motor, the vibrations experienced during operation of the system, as well as well other design constraints of the conveyor system 2. As the drive belt 8 passes over the guide wheel 16, the drive belt 8 pushes against the guide wheel 16 and displaces it away from the rollers 6. As the guide wheel 16 is displaced away, the pivoting of the arm 12 causes the spring side leg to move in the direction away from the spring 14, causing the spring 14 to elongate. As the spring 14 elongates, the tension force of the spring 14 increases, and continues to increase as the spring 14 elongates further. This increased tension force increasingly counteracts the pushing force experienced by the guide wheel 16 from the drive belt 8 and eventually equalizes to return the belt biasing device 10 and the drive belt 8 to equilibrium at the desired drive belt position.

In the illustrated embodiment of FIGS. 1 and 5, the belt biasing device 10 is pivotably coupled to the conveyor frame 4 by a bolt 34 and a nut 36 including a plurality of low friction washers 38. Optionally, a bushing 40 is provided and configured to decrease friction and allow the belt biasing device 10 to freely pivot about the bolt 34. In the illustrated embodiment of FIGS. 1 and 5, the guide wheel 16 is rotatably coupled to the arm 12 at the wheel mount hole 30 by a bolt 42 and a nut 44 including a plurality of low friction washers 46, wherein the bolt 42 forms an axle about which guide wheel 16 is freely rotatable. Optionally, a bearing may be disposed between the guide wheel 16 and the bolt 42 and configured to decrease friction between the wheel 16 and the bolt 42. The guide wheel 16 may include an integrated hub that is integrally formed with the guide wheel 16, as depicted in FIGS. 1-6. Alternatively, a wheel hub 52 is provided between the guide wheel 16b and the bolt 42, which may provide for ease of assembly and consistent, robust wheel alignment (see FIGS. 7 and 9), such hubs 52 are described in more detail below. The hub of each guide wheel 16 may have a different offset distance from its respective pivot arm 12, such an offset may provide for alignment of the guide wheels to compensate for the build-up or offset distance between the pivot arms 12. Optionally, the pivot arms may include bends or jogs 48 to alleviate such wheel offsets (see FIGS. 7-9), such bends or jogs 48 are further described below.

In one embodiment, illustrated in FIGS. 2, 3, 4, and 6, the scissor arm assembly 18 of the belt biasing device 10a is pivotably coupled to the conveyor frame 4 by a bolt 34 and a nut 36 including a plurality of low friction washers 38. Optionally, a bushing 40 is provided and configured to decrease friction and allow the belt biasing device 10 to freely pivot about the bolt 34. In the illustrated embodiment of FIGS. 2, 3, 4, 6, and 7, each guide wheel 16 is rotatably coupled to an arm 12 at the wheel mount hole 30 by a bolt 42 and a nut 44 including a plurality of low friction washers 46. Optionally, a bearing, not illustrated, is disposed between the guide wheel 16 and the bolt 42 and configured to decrease friction between the wheel 16 and the bolt 42.

Referring to FIGS. 7-10, an automatic drive belt biasing device 10b similar to automatic drive belt biasing device 10a is provided and includes a pair of pivot arms or bodies 12a, a tension spring 14, and a pair of drive belt guide wheels 16b in combination. The device 10b functions substantially the same as device 10a. Differences between devices 10a and 10b include that pivot arms 12a include offsets of lateral jogs 48 and a stud assembly 50 to couple the device 10b to the conveyor frame 4 (FIGS. 7-9). Pivot arms 12a perform similar function as arms 12 of device 10a described above, however, the offsets 48 enable the guide wheels 16 to be in nearly linear alignment with one another. The guide wheels 16b include hubs 52, such as sintered powder metal hubs, disposed between the guide wheels 16b and the bolt 42. The hub 52 is provided to simplify assembly of the device 10b and provide for robust and consistent wheel alignment relative to the pivot arms 12a.

Pivot arms 12a include bends or jogs 48 along each of the short leg 26 and the long leg 28 of the pivot arm 12a (FIGS. 7-9). The jogs 48 are provided such that when the pair of pivot arms 12a are coupled to one another, the offset between the wheel mounting surfaces of the distal ends of the pivot arms 12a relative to each other is reduced or eliminated (see FIG. 8, alignment illustrated with dashed line). The reduced offset in alignment of the wheel mounting surfaces provides for nearly linear alignment of the guide wheels 16b relative to each other without the need for different wheel spacers, bushings, or other hardware to compensate for pivot arm offset. The offset distance of each jog 48 is chosen as a function of the spacing between the pivot arms 12a due to the build-up of hardware (e.g. washers, bushings, etc.) disposed between the pivot arms 12a.

Figure 8A:
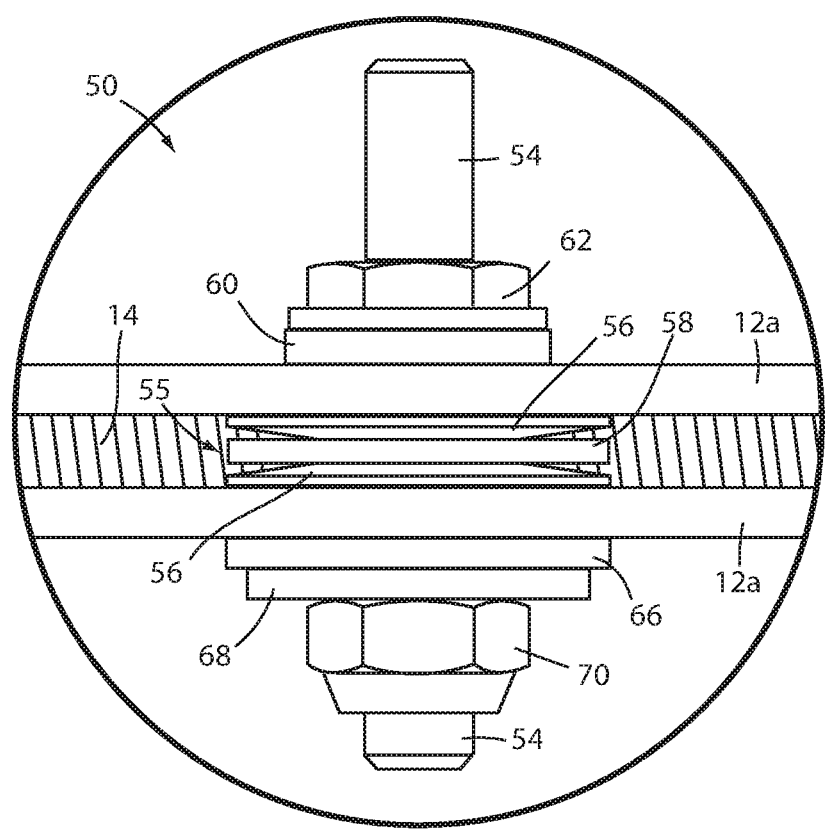
FIG. 8A is an enlarged view of the region designated 8A in FIG. 8.

The stud assembly 50 of device 10b enables device 10b to be fully assembled prior to attachment on a conveyor frame 4, as such, device 10b defines a stand-alone assembly. The stud assembly 50 includes a stud 54 configured to pivotably couple two or more pivot arms 12a together. The stud 54 passes through the mount holes 22 of the pivot arms 12a. A buildup of hardware 55 is disposed over the stud 54 and between the pivot arms 12a to enable the pivot arms 12a to substantially freely pivot relative to one another (FIGS. 8A and 9). The buildup 55 includes a pair of spring washers 56, such as Belleville disk springs, and a bushing or washer 58, such as a plastic thrust washer. The spring washers 56 provide a tight fit between the pivot arms 12a while allowing them to freely rotate relative to one another. The spring washers 56 also reduce vibration of the device 10b by absorbing shock and maintaining the tight fit between pivot arms 12a. The washer 58 is disposed between the pair of spring washer 56 and provides for a low friction wearing surface between the spring washers 56. Washer 58 may be formed of a wear-resistant plastic material. The stud assembly 50 further includes a sleeve bushing 60, shown as a flanged bushing, disposed over the stud 54 and configured to insert through and be received by the mount holes 22 (FIG. 9). The bushing 60 provides a wearing surface between the pivot arms 12a and the stud 54 that reduces wear and friction as the pivot arms 12a pivot relative to each other and the stud 54. The bushing 60 may be formed as an oil-embedded, flanged sleeve bushing. The stud 54 includes a flanged nut 62 fixed to the stud 54 to retain the bushing 60 and to provide a grip point for assembling and tightening the stud assembly 50 (FIGS. 8A and 9). A thrust washer 66, flat washer 68, and nut 70 are provided opposite the flanged nut 62 to secure the pivot arms 12a to the stud 54 (FIGS. 8A and 9). The thrust washer 66 may be formed of a wear resistant plastic material and provides a wearing surface between the washer 68 and the respective pivot arm 12a proximate the nut 70.

Accordingly, the automatic belt biasing device of the present invention provides an automatic and substantially continuous biasing force to a drive belt to bias the drive belt into frictional contact with rollers of a conveyor system. The automatic belt biasing device increases the biasing force on to the drive belt as the drive belt presses against the belt biasing device to counteract the force and return the system to equilibrium. The belt biasing device may take up some slack in a stretched or worn drive belt to extend the useful life of the worn or stretched belt and eliminate the need to change a drive belt due to decreased contact friction between the belt and the rollers, such decreased contact friction reduces the drive force applied to the rollers. The belt biasing device eliminates the need for maintenance personnel to manually loosen a belt biasing device, adjust its position, and then tighten the device, which often results in over-tensioning the drive belt and increases wear on the adjustment components. The belt biasing device reduces wear on the drive belt experienced due to too little tension on the belt, too much tension on the belt, or vibration experienced due to slack in the belt by automatically positioning the belt in contact with the conveyor rollers. The reduction in maintenance increases productivity and throughput within an order fulfillment center or distribution center caused by downtime.

Changes and modifications in the specifically described embodiments can be carried out without departing from the principles of the present invention, which is intended to be limited only by the scope of the appended claims, as interpreted according to the principles of patent law, including the doctrine of equivalents.

The embodiments of the invention in which an exclusive property is claimed are defined as follows:

1. A transport conveyor comprising:
    a conveyor frame;
    a motor supported at said conveyor frame;
    a plurality of rollers rotatably supported at said conveyor frame;
    an endless drive belt driven by said motor and configured to drive said plurality of rollers;
    an automatic drive belt biasing device pivotably supported at said conveyor frame, said automatic drive belt biasing device comprising:
    a scissor assembly having a pair of pivot arms pivotably coupled to each other in a scissoring manner proximate respective center portions of said pivot arms, said scissor assembly pivotably coupled to said conveyor frame proximate said endless drive belt;
    a pair of drive belt guide wheels rotatably coupled to respective ones of said pivot arms, one of said drive belt guide wheels coupled to one of said pivot arms and the other of said drive belt guide wheels coupled to the other of said pivot arms; and
    a spring disposed between said pivot arms and configured to apply a biasing force to each of said pivot arms to bias said belt guide wheels toward said drive belt in a manner that automatically adjusts the position of said drive belt relative to said rollers.

2. The transport conveyor of claim 1, wherein said drive belt comprises one of a type chosen from a v-belt, a poly v-belt, a flat belt, a flanged belt, a round belt, and a double v-belt and wherein each of said guide wheels comprises at least one chosen from a flanged wheel, a flat wheel, and a crowned wheel.

3. The transport conveyor of claim 1, wherein said spring comprises a tension spring and each of said pivot arms comprises a short leg and a long leg, wherein a proximal end of said short leg and a proximal end of said long leg are fixedly coupled to one another proximate the center portion of said pivot arm, said pivot arm is selectively reconfigurable for at least two different roller pitch distances by switching the location of said guide wheel and said spring on said pivot arm, wherein said pivot arm is in a first configuration when said belt guide wheel is rotatably coupled at a distal end of said long leg and said spring is coupled at a distal end of said short leg and said pivot arm is in a second configuration when said belt guide wheel is rotatably coupled at a distal end of said short leg and said spring is coupled at a distal end of said long leg.

4. The transport conveyor of claim 3, wherein said short leg and said long leg are fixedly coupled at an obtuse angle relative to each other.

5. The transport conveyor of claim 3, wherein said short leg comprises a short leg indicator disposed at said short leg and said long leg comprises a long leg indicator disposed at said long leg.

6. The automatic drive belt biasing device of claim 3, wherein said pitch distance is substantially equal to a distance between a first gap between a pair of adjacent rollers and second gap between another pair of adjacent rollers, such that one of said belt guide wheels is disposed substantially adjacent to said first gap and the other of said belt guide wheels is disposed substantially adjacent to said second gap.

7. The transport conveyor of claim 1, wherein each of said belt guide wheels is positioned adjacent to a gap between adjacent ones of said rollers.

8. The transport conveyor of claim 1, wherein at least one of said pivot arms comprises a lateral offset such that said guide belt wheels are positioned in linear alignment relative to one another.

9. An automatic drive belt biasing device for biasing a drive belt into frictional contact with a conveyor roller, said automatic drive belt biasing device comprising:
   a spring;
   a pair of scissoring pivot arms; and
   a pair of drive belt guide wheels;
   wherein said scissoring pivot arms are pivotably coupled to each other in a scissoring manner proximate respective center portions of said pivot arms;
   wherein one of said pair of belt guide wheels is rotationally disposed at one end of one of said pair of pivot arms and the other of said belt guide wheels is rotationally disposed at one end of the other of said pivot arms;
   wherein said spring is disposed between said pivot arms and configured to bias said belt guide wheels toward the drive belt in a manner that automatically adjusts a biasing force of said belt guide wheels on the drive belt.

10. The transport conveyor of claim 9, wherein each of said belt guide wheels comprises at least one chosen from a flanged wheel, a flat wheel, and a crowned wheel.

11. The transport conveyor of claim 9, wherein each of said belt guide wheels is positioned adjacent to a gap between adjacent ones of conveyor rollers.

12. The transport conveyor of claim 9, wherein said spring comprises a tension spring and each of said pivot arms comprises a short leg and a long leg, wherein a proximal end of said short leg and a proximal end of said long leg are fixedly coupled to one another proximate the center portion of said pivot arm, said pivot arm is selectively reconfigurable for at least two different roller pitch distances by changing the location of the guide wheel and the spring on said pivot arm, wherein said pivot arm is in a first configuration when said belt guide wheel is rotatably coupled at a distal end of said long leg and said spring is coupled at a distal end of said short leg and said pivot arm is in a second configuration when said belt guide wheel is rotatably coupled at a distal end of said short leg and said spring is coupled at a distal end of said long leg.

13. The transport conveyor of claim 12, wherein said short leg comprises a short leg indicator disposed at said short leg and said long leg comprises a long leg indicator disposed at said long leg.

14. An automatic drive belt biasing device for biasing a drive belt into frictional contact with a conveyor roller, said automatic drive belt biasing device comprising:
   a pivot arm pivotably supported about a center portion of said pivot arm at a portion of a conveyor frame proximate a drive belt of a conveyor roller;
   a drive belt guide wheel rotatably coupled at one end of said pivot arm; and
   a spring coupled at an end of said pivot arm opposite of said belt guide wheel, said spring applies a biasing force to said pivot arm to bias said belt guide wheel toward the drive belt in a manner which automatically adjusts the position of the drive belt relative to the conveyer roller.

15. The automatic drive belt biasing device of claim 14, further comprising another pivot arm pivotably coupled to said pivot arm in a scissoring manner proximate respective center portions of said pivot arm and said another pivot arm to form a scissoring arm assembly and a belt guide wheel rotatably coupled at one end of said another pivot arm, wherein said spring comprises a tension spring that is disposed between said pivot arm and said another pivot arm at respective ends of said pivot arms opposite respective ones of said belt guide wheels, said tension spring configured to bias said belt guide wheels toward the drive belt in a manner which automatically adjusts the biasing force applied to the drive belt by said belt guide wheels.

16. The automatic drive belt biasing device of claim 14, wherein said pivot arm comprises a short leg and a long leg, wherein a proximal end of said short leg and a proximal end of said long leg are fixedly coupled to one another proximate the center portion of said pivot arm, said pivot arm is selectively configurable for at least two different roller pitch distances by changing the location of said guide wheel and said spring on said pivot arm, wherein said automatic drive belt biasing device is in a first configuration when said belt guide wheel is rotatably coupled at a distal end of said long leg and said spring is coupled at a distal end of said short leg and said automatic drive belt biasing device is in a second configuration when said belt guide wheel is rotatably coupled at a distal end of said short leg and said spring is coupled at a distal end of said long leg.

17. The automatic drive belt biasing device of claim 16, wherein said short leg and said long leg are fixedly coupled at an obtuse angle relative to each other.

18. The automatic drive belt biasing device of claim 16, wherein said short leg comprises a short leg indicator disposed at said short leg and said long leg comprises a long leg indicator disposed at said long leg.

19. The automatic drive belt biasing device of claim 16, wherein said pitch distance is substantially equal to a distance between a first gap between a pair of adjacent conveyor rollers and second gap between another pair of adjacent conveyor rollers, such that one of said belt guide wheels is disposed substantially adjacent to said first gap and the other of said belt guide wheels is disposed substantially adjacent to said second gap.

20. A method for automatically biasing an endless drive element into frictional contact with a conveyor roller, said method comprising:
   automatically adjusting a biasing force of an automatic belt biasing device due to changes in force between an endless drive element and the automatic belt biasing device, said automatically adjusting a biasing force of the automatic belt biasing device comprises applying a force to a first end of a pivot arm of the automatic belt biasing device, wherein the pivot arm is coupled at a center portion to a conveyor frame;

transferring the adjusted biasing force to an endless drive element guide wheel to bias the guide wheel toward the endless drive element, the guide wheel coupled at a second end of the pivot arm opposite the first end; and biasing the endless drive element, with the guide wheel, into frictional contact with a conveyor roller supported on the conveyor frame.

* * * * *